United States Patent [19]
Rinaldi et al.

[11] Patent Number: 5,534,676
[45] Date of Patent: Jul. 9, 1996

[54] SYSTEM FOR AUTOMATICALLY CONTROLLING WELD MATERIAL BEADING IN ORBITAL WELDING PROCESSES FOR MEDIUM- AND LARGE-SIZE PIPES

[75] Inventors: Fernando Rinaldi, Guardamiglio; Guglielmo Crivellaro, Paullo; Rinaldo Denaro, Pantigliate, all of Italy

[73] Assignees: P.W.T. S.p.A., Milan; S & H S.n.c. di Guglielmo Crivellaro & C., Peschiera Borromeo, both of Italy

[21] Appl. No.: 446,971

[22] Filed: May 22, 1995

[30] Foreign Application Priority Data

May 26, 1994 [IT] Italy ................................. TO94A0433

[51] Int. Cl.⁶ ................................................. B23K 9/095
[52] U.S. Cl. .................................. 219/124.34; 219/60 R; 219/61; 219/125.11
[58] Field of Search ......................... 219/124.34, 125.11, 219/60 R, 61

[56] References Cited

U.S. PATENT DOCUMENTS

| | | | |
|---|---|---|---|
| 4,132,338 | 1/1979 | Bove et al. | 219/125.11 |
| 4,144,992 | 3/1979 | Omae et al. | 219/125.11 |
| 4,596,919 | 6/1986 | Kremers et al. | 219/124.34 |
| 4,636,612 | 1/1987 | Cullen | 219/124.34 |
| 4,881,678 | 11/1989 | Gaudin | 219/61.5 |

FOREIGN PATENT DOCUMENTS

| | | |
|---|---|---|
| 300369 | 1/1989 | European Pat. Off. |
| 423088 | 4/1991 | European Pat. Off. |
| 2412380 | 7/1979 | France |
| 2558250 | 7/1985 | France |

OTHER PUBLICATIONS

Patent Abstracts of Japan—vol. 16 No. 534 (M–1334) 4 Nov. 1992 & JP–A–04 200866 (NKK Corp) 21 Jul. 1992.
Robotersysteme vol. 8, No. 3, 1992 Berlin DE, pp. 148–154, XP 000297674 P. Drews et al. "Sensor System . . . ".

*Primary Examiner*—Clifford C. Shaw
*Attorney, Agent, or Firm*—Guido Modiano; Albert Josif

[57] ABSTRACT

The system comprises: a distance sensing device for sequentially acquiring, during the welding process or before it, individual transverse profiles of the welding gap by gauging its various depths; electronic units for parametrically reconstructing, by combined numeric and vector calculation, the parametric and topological features of the welding gap starting from the various depths acquired by gauging points; electronic circuits that are adapted to compare the features of the acquired welding gap profile and the stored features of the profile of a corresponding nominal ideal welding gap and to infer corresponding data for varying the parameters of the welding process; and control subsystems using, selectively or in combination, one or more of the variation data to adapt corresponding welding parameters.

18 Claims, 3 Drawing Sheets

SYSTEM FOR AUTOMATICALLY CONTROLLING WELD MATERIAL BEADING IN ORBITAL WELDING PROCESSES FOR MEDIUM- AND LARGE-SIZE PIPES

BACKGROUND OF THE INVENTION

The present invention relates to a system for automatically controlling weld material beading in automatic orbital welding processes for medium- and large-size pipes, such as pipes for oil and gas pipelines and the like.

It is known that the method for performing orbital welding with the known processes termed "MIG" or "MAG" (Metal Inert Gas or Metal Active Gas) consists in depositing, by means of multiple runs, a series of overlapping welding beads in the flared groove, commonly termed welding gap, which is delimited by chamfers or flared regions that are provided on the juxtaposed heads of the sequentially arranged pipe segments. The apparatus for performing this welding process is substantially constituted by an annular rail that is fitted and locked on the pipeline and by one or more movable welding carriages, typically two, which move at a controlled speed and in opposite directions along said rail, each one orbiting around the pipeline over a 180° arc. Each carriage has wheels for engaging the rail and sliding on it, a driving pinion meshing with a toothed rim of the rail to move the carriage, and at least one oscillating welding torch of the continuous-wire type.

During the welding process, the rail is placed proximate to the section to be welded, and the welding carriages are engaged on it; the welding torches of the carriages are aligned with said welding gap. Owing to the flared profile of the welding gap, the amount of deposited material increases gradually as the torch moves away from the axis of the pipe with each run. Accordingly, the torch, which is initially fixed with respect to the carriage, is subjected to an oscillating motion the extent, frequency, and turnaround period (stop time after each elongation) whereof vary, both in passing from one welding bead to the next and in forming a same welding bead, according to the position of the carriage along the circumference of the pipe, due to the influence of gravity on the deposited metal, which is liquid. The motion speed of the carriage and the rate at which the welding wire is fed also depend on the position of the carriage along the circumference of the pipe, and in current orbital welding devices this set of parameters is controlled by a microprocessor according to programmed sequences for each run and for a given welding gap profile.

It is evident that correct automatic control of the many welding parameters assumes that said welding gap profile is constant; however, said profile can undergo even significant variations due to imperfections in machining, which is usually performed on site, due to more or less conspicuous axial misalignments of the juxtaposed pipe segments, due to the imperfect linearity of the pipe segments, and/or due to the imperfect perpendicularity of the head sections with respect to the axis of the pipeline being treated. Any unevennesses in the material of the pipes, such as hollows, cracks, and the like, can also affect the profile of the welding gap, whose axis may furthermore lie at least partially outside of the ideal perpendicular cross-section of the pipe and have, entirely or partially, a helical orientation with respect to the axis of the pipe.

The unevennesses of the profile and of the axial orientation of the welding gap are, in any case, unavoidable and cause considerable problems in the above mentioned automated orbital welding processes, often forcing to resort to manual interventions of specialized workers, who monitor the welding process and intervene, by means of appropriate remote controls, so as to compensate the unevennesses of the welding gap by varying one or more of the parameters of the welding process.

Thus, for example, a discontinuity constituted by a localized tapering of the profile of the welding gap at the level of the current run is compensated manually by reducing the extent of the oscillation and the turnaround period of the torch and/or the rate at which the welding wire is fed, in order to momentarily reduce the weld material beading so as to keep the thickness of the welding bead constant along the entire circumference of the pipe.

On the contrary, a localized widening of the profile of the welding gap at the level of the current run requires an increase in the extent of the oscillation of the torch, an increase in the rate at which the wire is fed, and a possible decrease of the oscillation turnaround period, in order to momentarily increase the weld material beading, again to keep the thickness of the welding bead constant along the entire circumference of the pipe. If instead, the orientation of the axis of the welding gap has discontinuous portions that have a helical orientation, it is necessary to intervene so as to correspondingly move the oscillation axis of the torch, so as to prevent the oscillation itself from being off-center with respect to the welding gap and prevent the welding wire from interfering with one of the walls of said gap.

SUMMARY OF THE INVENTION

The aim of the present invention is substantially to eliminate these and other manual interventions in the orbital welding process by automatically controlling the weld material beading in the presence of discontinuities in the profile and/or in the orientation of the axis of the welding gap, in order to perform, in a fully automatic manner, high-standard welds characterized by the overlap of welding beads that have a strictly constant thickness and entirely and correctly fill the cavity of the welding gap.

Within the scope of this general aim, the invention achieves numerous advantages, and most of all it entirely avoids the need to adopt expensive and difficult machining operations to produce welding gaps whose arrangement and dimensions are as constant and uniform as possible.

According to the invention, this aim, this object, and others are achieved with a system for automatically controlling weld material beading as defined in the appended claims.

Substantially, the invention is based on the concept of sequentially acquiring, before or during the welding process, individual transverse profiles of the welding gap by gauging, with a distance sensor, the depth values of said welding gap; of parametrically reconstructing, by means of combined numeric and vector calculation, the geometric and topographical features of the welding gap measured by means of said gauging points; and of comparing the features of the acquired welding gap and the stored features of a corresponding nominal ideal welding gap, obtaining corresponding data for varying the parameters of the welding process. Advantageously, the system according to the invention uses, to acquire the geometric profile of the welding gap, a device for measuring distances starting from a given origin that is based on the measurement of a beam reflected by the walls of the welding gap and emitted by the device itself.

The distance measurement device is controlled by means for moving it longitudinally and/or transversely with respect to the welding gap, and is used to determine, parameterize, and store the depth of each point of the welding gap. Preferably, according to the invention, the distance measurement device comprises an emitter that produces a punctiform laser beam cooperating with a receiver for said beam.

BRIEF DESCRIPTION OF THE DRAWINGS

The invention will become apparent from the following detailed description and with reference to the accompanying drawings, given by way of non-limitative example, wherein.

DESCRIPTION OF THE PREFERRED EMBODIMENTS

Figure 1:
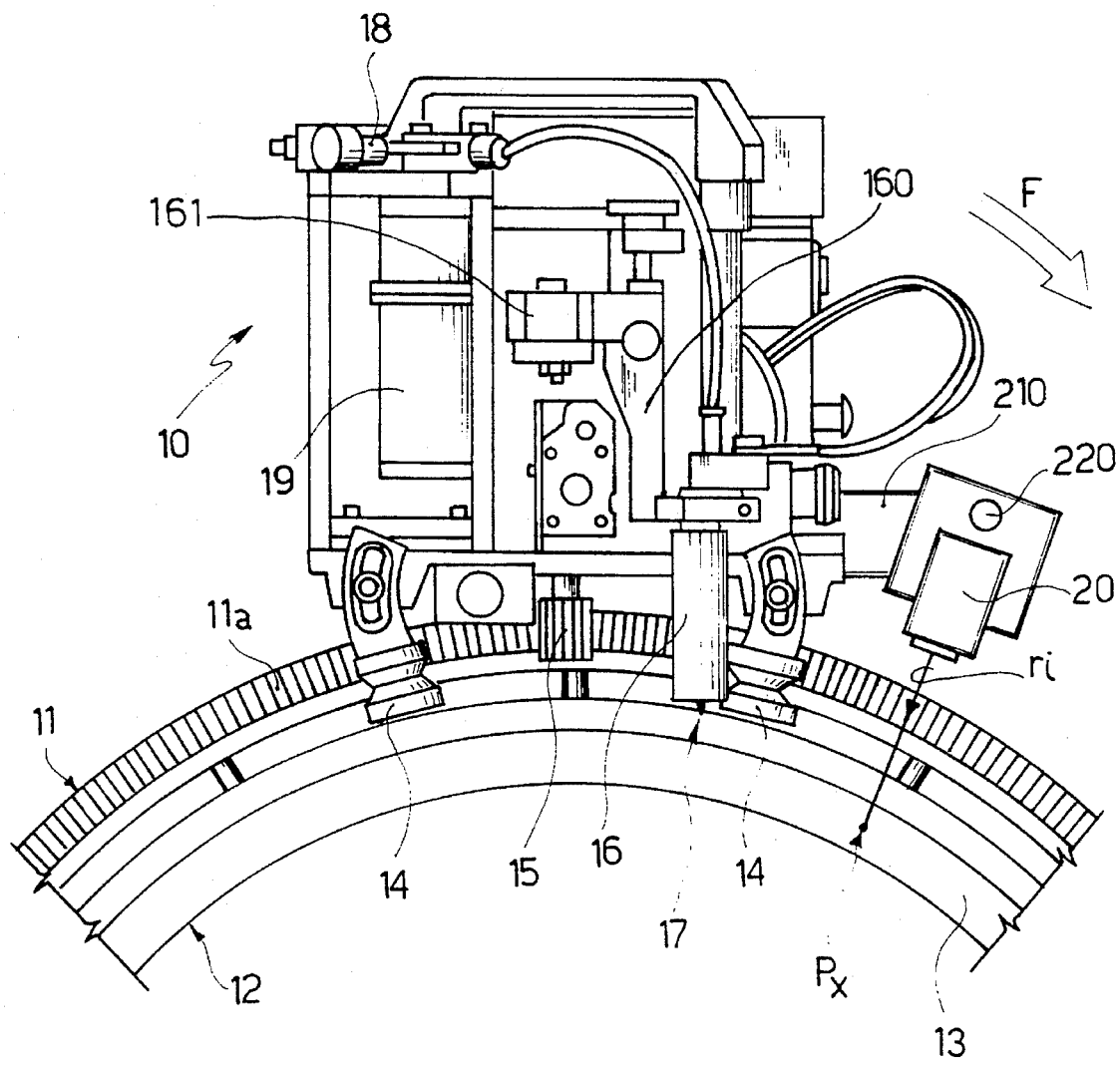
FIG. 1 is a front view of an orbital welding carriage operating at the end of a pipe and provided with the automatic control system according to the invention.

In FIG. 1, the reference numeral 10 designates the welding carriage of a known type of orbital welding apparatus; said carriage is engaged on a circular rail 11 that is mounted at the end of a pipe 12 whose end is adjacent to a pipe 12a; a welding gap 13 is formed in the joint section. The carriage 10 is known per se and comprises pairs of wheels 14 for engaging and sliding on the rail 11, a driving pinion 15 meshing with a toothed rim 11a of said rail, and a welding torch 16 of the continuous-wire type, which is mounted at the end of an arm 160 rigidly coupled to a support 161 oscillatable about an axis that lies radially with respect to the tube 12. A continuous metal wire 17 is fed to the torch 16 by a traction device 18 at a controlled rate; said device draws said wire from a storage spool 19.

According to the invention, a distance measurement device 20 is provided on the front part of the carriage 10 with reference to the direction of motion designated by the arrow F. The device 20 is supported by a support 210 of the carriage 10 above the welding gap 13 so that it can perform, by virtue of a screw 220 driven by a reversible motor "m" and cooperating with a nut 221 of the support (FIG. 2), transverse movements; with respect to said welding gap, whereas the motion of the carriage 10 allows the device 20 to move along the axis of said welding gap.

Figure 2:
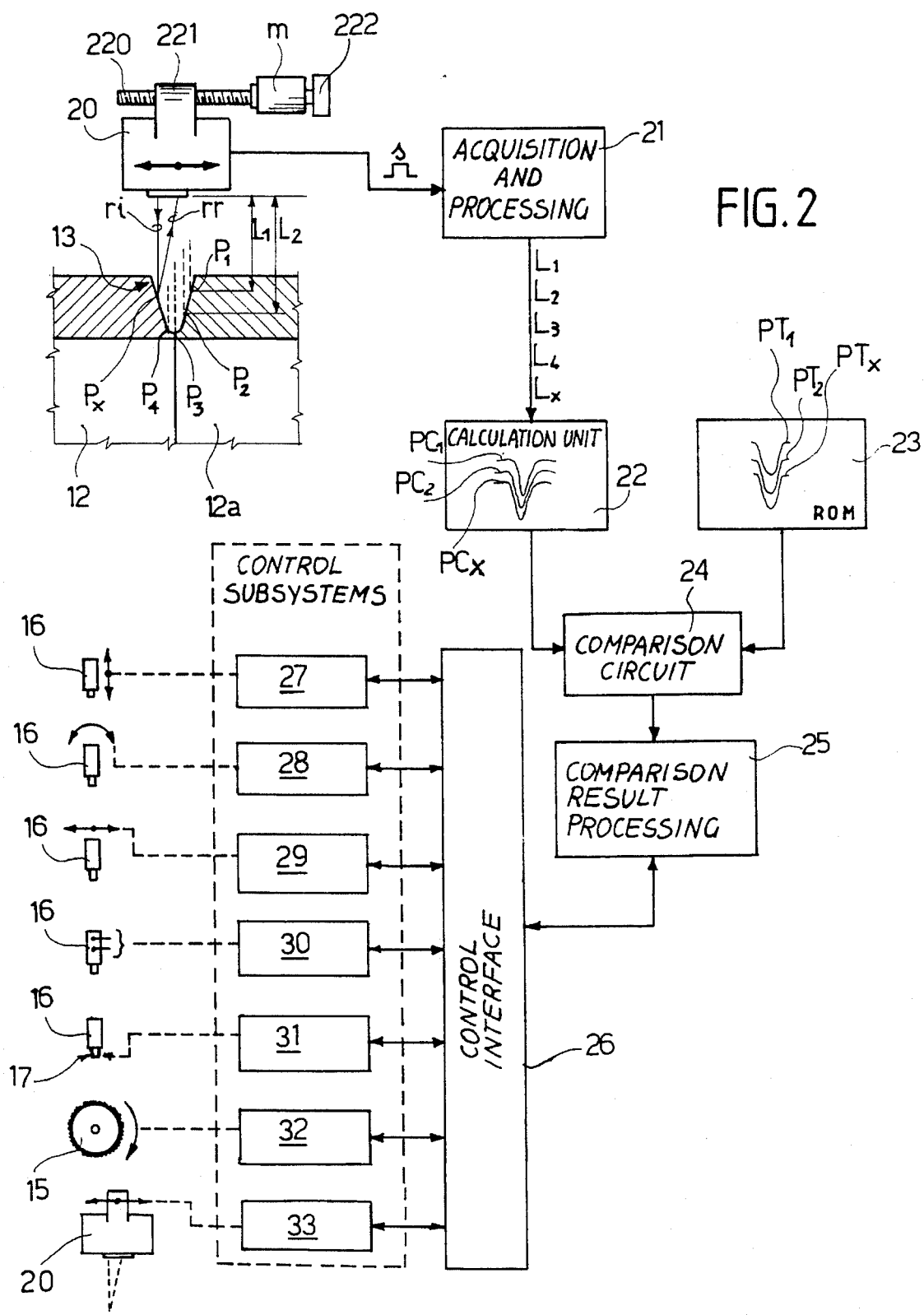
FIG. 2 is a block diagram of the automatic control system according to the invention.

The measurement device 20 is of the known laser-beam type and is constituted for example by the series LM-100 (LASER ANALOG SENSOR) type ANL 1651EC sensor, manufactured by MATSUSHITA AUTOMATION CONTROLS and comprises a driver circuit, an LED, and a system of focusing lenses producing a punctiform laser beam "ri" that strikes the surface of the welding gap 13 (FIG. 2). The beam "rr" reflected by the surface of the welding gap is received by a detector of the device 20 and strikes different regions of said detector for each distance of the incidence point from the source of the incident beam; said detector produces a signal "s" corresponding to said distance L.

FIG. 2 illustrates a substantially triangular welding gap 13 above which is provided the measurement device 20, which is supported by the welding carriage 10. During the welding process, the device 20, which precedes the welding carriage, is moved transversely with respect to the welding gap 13 by means of the screw device 22 and gauges the depth of said welding gap at points such as P1-P2-P3-Px etcetera. An encoder 222, associated with the motor "m" and operatively connected to a control subsystem 33 described hereinafter, controls the transverse position of the device 20. The corresponding signals "s" emitted for each gauging by the measurement device 20 are applied to the input of an electronic acquisition and processing circuit 21 that supplies, in output, a numeric datum corresponding to the distances L1-L2-L3-Lx of each gauging point from the source that emits the incident beam "ri".

A combined numeric and vector calculation unit 22, operatively connected to the output of the circuit 21, parametrically reconstructs the geometric and topological features, that is to say, the profile PC of the welding gap 13 in the gauged section.

A sequence of profiles $PC_1$-$PC_2$ ... $PC_x$, acquired by gauging, is compared, in real time or after being stored, with a similar sequence of respective nominal ideal profiles $PT_1$-$PT_2$ ... $PT_x$, stored in numeric form in a permanent and rewritable memory 23, for example an electrically erasable programmable read only memory EEPROM.

A comparison circuit 24 performs a comparative analysis between the acquired welding gap profiles $PC_1$-$PC_2$ ... $PC_x$ and the corresponding nominal ideal profiles $PT_1$-$PT_2$ ... $PT_x$, and a circuit 25 for the mathematical processing of the comparison result produces corresponding signals for selectively varying the control parameters of the welding process in order to ensure that the characteristics, particularly the thickness, of each welding bead, are constant.

The processing circuit 25, by means of a control interface 26, is operatively and bidirectionally connected to a plurality of feedback control subsystems, designated by the reference numerals 27 to 33, which act on respective actuators for actuating the torch and the carriage. In particular, the control subsystem 27 controls the vertical movement of the welding torch 16, varying its elevation with respect to the level of the bead being formed, in order to vary the length of the electric arc; the subsystem 28 controls the extent and turnaround period of the oscillation of the torch 16; the subsystem 29 controls the lateral movement of the torch 16 and, accordingly, the movement of the oscillation axis of the torch with respect to the axis of the welding gap 13; the subsystem 30 controls the welding current generator; the subsystem 31 controls the advancement rate of the welding wire 17; the subsystem 32 controls the rotation rate of the driving pinion 15 and, accordingly, the advancement rate of the carriage 10; and the subsystem 33 controls, as mentioned, the transverse position of the device 20 with respect to the welding gap 13, by virtue of the signals received from the encoder 222.

Figure 3:
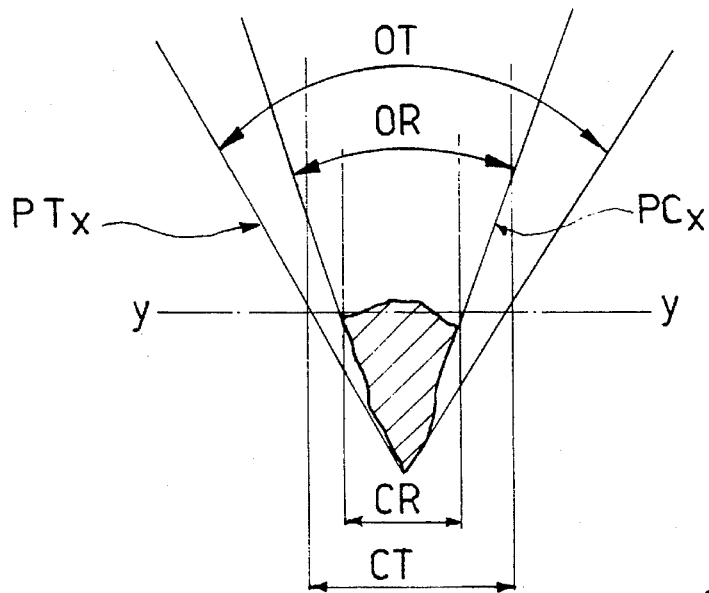
FIGS. 3 and 3a illustrate the comparison between the acquired welding gap and the ideal one and the corresponding calculation diagram for varying the affected welding parameter.
Figure 3A:
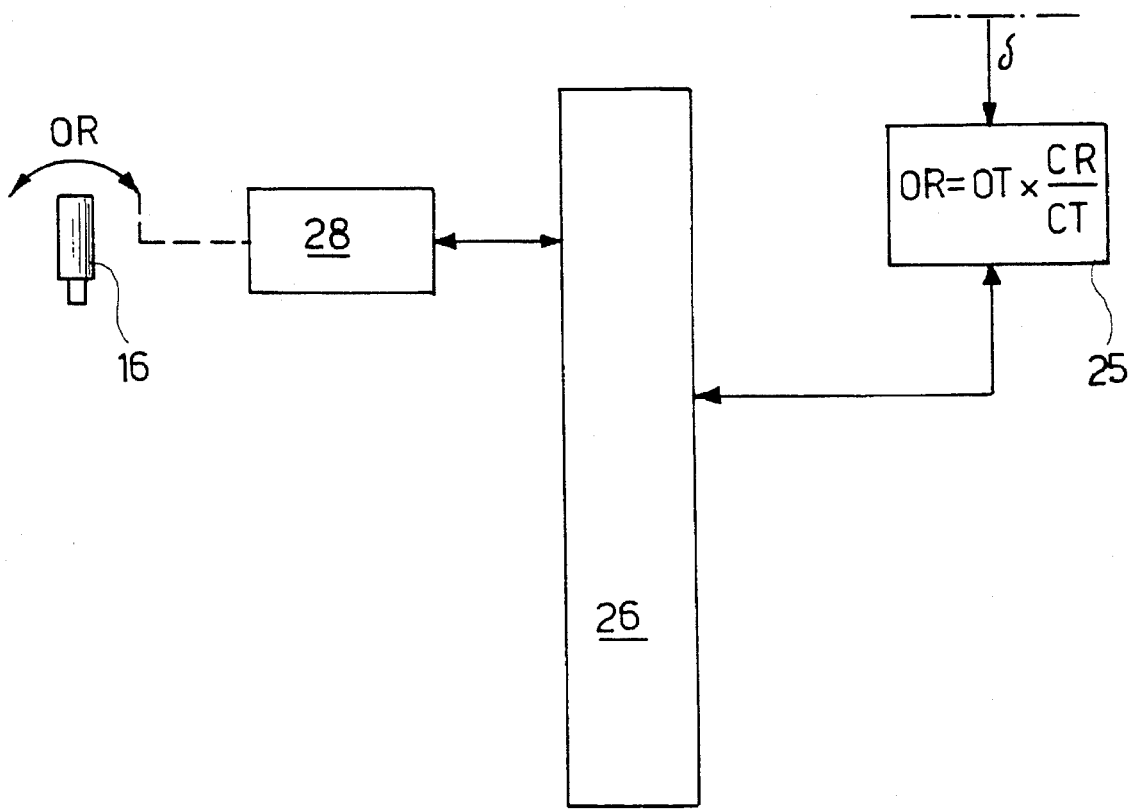

FIGS. 3 and 3a show, by way of example, the modality for calculating the variation of one of said parameters in relation to the data obtained from the comparison of a generic profile $PC_x$, acquired by gauging as specified above and parametrically reconstructed by the calculation unit 22, with a corresponding nominal ideal profile $PT_x$ stored in the EEPROM 23.

The comparison between the two welding gaps $PC_x$ and $PT_x$ shows that, at the run level y-y being considered, the width CR of the measured welding gap $PC_x$ is smaller, by an amount [δ], than the width CT of the ideal welding gap $PT_x$. Accordingly, the ideal oscillation arc OT of the torch 16 must be reduced by an amount [Φ] to a value OR that corresponds to the real width of the welding gap. For this purpose, the circuit 25 receives from the circuit 24 a signal [δ] that is equal to the ratio CR/CT, and calculates the value OR of the real oscillation arc, assuming:

$$OR = OT \times CR/CT$$

The value of OR calculated in this way is sent, by means of the control interface 26, to the control subsystem 28, which correspondingly varies the oscillation arc of the torch.

The details of execution and the embodiments may of course vary extensively with respect to what has been described by way of non-limitative example without altering the concept of the invention.

In particular, the device 20, instead of being controlled by the independent transverse motion system comprising the screw 220 and the nut 221, can be mounted so that it is rigidly associated with the support 161 of the torch 16 by means of an appropriate arm, not shown, that is arranged diametrically opposite with respect to the support 161. In this way, the control subsystem 33 is eliminated, and the transverse motion of the device 20 with respect to the welding gap 13 is controlled by the control subsystem 28, which is provided to control the oscillation of the torch 16. This variation and other constructive embodiments are within the scope of the invention as defined by the appended claims.

What is claimed is:

1. A control system for automatically controlling a series of orbital welding bead depositions in a welding gap disposed between a pair of juxtaposed pipe segments, comprising:

a welding carriage;

a guide arrangeable about the juxtaposed pipe segments for guidably supporting said welding carriage;

a drive mechanism for orbitally moving said welding carriage on said guide;

a welding torch movably mounted on said welding carriage including a welding current generator;

a drive mechanism for moving said welding torch into selected positions with respect to the welding gap;

a metal wire feed device mounted on said welding carriage for feeding metal wire to said welding torch;

a welding gap profile measurement device for determining a plurality of measured welding gap profiles of the welding gap as the welding carriage travels on said guide, said welding gap profile measurement device producing electrical signals corresponding to said plurality of measured welding gap profiles;

an electronic memory device storing a plurality of nominal welding gap profiles, said electronic memory device being adapted for sending electrical signals corresponding to said plurality of nominal welding gap profiles;

comparison and processing electrical circuitry electrically connected to said welding gap profile measurement device and said electronic memory device for receiving and comparing said electrical signals corresponding to said plurality of measured welding gap profiles and plurality of nominal welding gap profiles, and said comparison and processing electrical circuitry being operative to process said signals for producing welding control electrical signals, said comparison and processing electrical circuitry being electrically connected to at least one of: said drive mechanism for moving said welding torch; said welding current generator of said welding torch; said metal wire feed device; and said drive mechanism for orbitally moving said welding carriage on said guide, such that said welding control electrical signals control at least one of: the movement of said welding torch with respect to the welding gap; the welding current generated by said welding current generator; the wire feed rate of said metal wire feed device; and the movement of said welding carriage on said guide.

2. The control system of claim 1 wherein said welding gap profile measurement device is mounted on said carriage so as to perform a transverse movement with respect to the longitudinal extension of the welding gap, the system further comprising a drive mechanism for moving said measurement device and said comparison and processing electrical circuitry being electrically connected to said drive mechanism for moving said measurement device such that said welding control electrical signals further control the movement of said measurement device.

3. The control system of claim 2 wherein said comparison and processing electrical circuitry is electrically connected to each one of: said drive mechanism for moving said welding torch; said welding current generator of said welding torch; said metal wire feed device; and said drive mechanism for orbitally moving said welding carriage on said guide, such that said welding control electrical signals control each one of: the movement of said welding torch with respect to the welding gap; the welding current generated by said welding current generator; the wire feed rate of said metal wire feed device; and the movement of said welding carriage on said guide.

4. The control system of claim 1 wherein said welding torch is mounted on said carriage such that said welding torch is moveable in both a vertical and lateral direction with respect to the longitudinal extension of the welding gap and such that the welding torch is oscillatable about an axis which extends substantially parallel to a tangent of the longitudinal extension of the welding gap.

5. The control system of claim 1 wherein said welding gap profile measurement device is mounted on said carriage so as to perform an essentially identical movement performed by said welding torch with respect to said carriage.

6. The control system of claim 1 wherein said welding gap profile measurement device comprises a distance measuring device for measuring distances that are measured starting from a given origin, based on measurement of a beam that is reflected by walls of the welding gap and is emitted by the distance measuring device.

7. The control system of claim 6 wherein the distance measuring device for gauging depths of different points of the welding gap is constituted by a punctiform laser beam emitter that cooperates with a receiver for a beam reflected by the walls of the welding gap.

8. The control system of claim 6 wherein said drive mechanism for moving said distance measurement device comprises a reversible motor having a screw-and-nut mechanism that is controlled by said reversible motor for moving the distance measuring device transversely with respect to the welding gap; an encoder for controlling a transverse position of the distance measuring device with respect to the welding gap being associated with the motor.

9. The control system of claim 6 wherein the distance measurement device is rigidly coupled to an oscillating support of the welding torch, said device being movable transversely with respect to the welding gap upon oscillation of said support.

10. The control system of claim 6 wherein the distance measuring device emits, for each gauging, a gauging signal;

wherein the gauging signals are applied to an input of an electronic acquisition and processing circuit providing in output a numeric datum that corresponds to a distance of each gauging point from the emission source of said punctiform laser beam; and wherein a calculation unit, being operatively connected to the acquisition and processing circuit, receives said numeric data and parametrically reconstructs from said numeric data a profile of the welding gap in the gauged section.

11. The control system of claim 1 wherein said electronic memory device comprises at least one permanent and rewritable memory, said memory containing, in numeric form, a series of nominal ideal profiles of the welding gap, said profiles corresponding to a series of gauged real sections; said memory being operatively connected to said comparison and processing electrical circuitry that furthermore receives acquired welding gap profiles features, also expressed in numeric form, said features being selectively receivable in a direct mode and after storage.

12. The control system of claim 11 wherein the comparison and processing circuitry performs a numeric comparison between the acquired profiles and stored nominal ideal ones and processes numeric results of a the numeric comparison.

13. A control system for automatically controlling a series of orbital welding bead depositions in a welding gap disposed between a pair of juxtaposed pipe segments, comprising:

a welding carriage;

guide means arrangeable about the juxtaposed pipe segments for guidably supporting said welding carriage;

drive means for orbitally moving said welding carriage on said guide;

a welding torch movably mounted on said welding carriage including a welding current generator;

drive means for moving said welding torch into selected positions with respect to the welding gap;

a metal wire feed device mounted on said welding carriage for feeding metal wire to said welding torch;

measuring means for determining a plurality of measured welding gap profiles of the welding gap as the welding carriage travels on said guide, said measuring means producing electrical signals corresponding to said plurality of measured welding gap profiles;

memory means storing a plurality of nominal welding gap profiles, memory means being adapted for sending electrical signals corresponding to said plurality of nominal welding gap profiles;

comparison and processing means electrically connected to measurement means and said memory means for receiving and comparing said electrical signals corresponding to said plurality of measured welding gap profiles and plurality of nominal welding gap profiles, and for processing said signals for producing welding control electrical signals, said comparison and processing means being electrically connected to at least one of: said drive means for moving said welding torch; said welding current generator of said welding torch; said metal wire feed device; and said drive means for orbitally moving said welding carriage on said guide, such that said welding control electrical signals control at least one of: the movement of said welding torch with respect to the welding gap; the welding current generated by said welding current generator; the wire feed rate of said metal wire feed device; and the movement of said welding carriage on said guide.

14. The control system of claim 13 wherein said measuring means is mounted on said carriage so as to perform a transverse movement with respect to the longitudinal extension of the welding gap, the system further comprising means for moving said measurement means, and said comparison and processing means being electrically connected to means for moving said measurement means such that said welding control electrical signals further control the movement of said measurement means.

15. The control system of claim 14 wherein said comparison and processing means is electrically connected to each one of: said drive means for moving said welding torch; said welding current generator of said welding torch; said metal wire feed device; and said drive means for orbitally moving said welding carriage on said guide, such that said welding control electrical signals control each one of: the movement of said welding torch with respect to the welding gap; the welding current generated by said welding current generator; the wire feed rate of said metal wire feed device; and the movement of said welding carriage on said guide.

16. A method for automatically controlling a series of orbital welding bead depositions in a welding gap disposed between a pair of juxtaposed pipe segments, comprising the steps of:

orbitally moving a welding carriage on a guide arranged about the juxtaposed pipe segments, the welding carriage supporting: a moving welding torch including a current generator; and a metal wire feed device;

determining a plurality of measured welding gap profiles of the welding gap as the welding carriage travels on said guide;

producing electrical signals corresponding to said plurality of measured welding gap profiles;

storing a plurality of nominal welding gap profiles in a memory and producing electrical signals corresponding to said plurality of nominal welding gap profiles;

comparing said electrical signals corresponding to said plurality of measured welding gap profiles and plurality of nominal welding gap profiles, and processing said signals for producing welding control electrical signals; and controlling by means of said welding control electrical signals at least one of: the movement of said welding torch with respect to the welding gap; the welding current generated by said welding current generator; the wire feed rate of said metal wire feed device; and the movement of said welding carriage on said guide.

17. The method of claim 16 wherein the step of determining a plurality of measured welding gap profiles is performed by a welding gap profile measurement device movably mounted on said welding carriage so as to perform a transverse movement with respect to the longitudinal extension of the welding gap, and wherein the method further includes the step of controlling by means of said welding control electrical signals the movement of said welding gap profile measurement device.

18. The method of claim 17 comprising controlling by means of said welding control electrical signals each one of: the movement of said welding torch with respect to the welding gap; the welding current generated by said welding current generator; the wire feed rate of said metal wire feed device; and the movement of said welding carriage on said guide.

* * * * *